(12) United States Patent
Brass et al.

(10) Patent No.: US 6,926,048 B2
(45) Date of Patent: Aug. 9, 2005

(54) APPARATUS AND METHOD FOR URGING FLUID INTO A PRESSURIZED SYSTEM

(75) Inventors: Jack Brass, Toronto (CA); Jim Resutek, Romeo, MI (US)

(73) Assignee: Brasscorp Ltd. (CA)

( * ) Notice: Subject to any disclaimer, the term of this patent is extended or adjusted under 35 U.S.C. 154(b) by 0 days.

(21) Appl. No.: 10/413,469

(22) Filed: Apr. 15, 2003

(65) Prior Publication Data

US 2003/0178098 A1 Sep. 25, 2003

Related U.S. Application Data

(63) Continuation of application No. 09/722,633, filed on Nov. 28, 2000, now Pat. No. 6,561,237.

(51) Int. Cl.[7] ................................................ F25B 45/00
(52) U.S. Cl. ...................................................... 141/383
(58) Field of Search .......................... 141/1–5, 18, 21, 141/346, 348, 349, 351–354, 383–386; 62/292

(56) References Cited

U.S. PATENT DOCUMENTS

| | | | |
|---|---|---|---|
| 2,925,103 A | 2/1960 | Kerr et al. | 141/349 |
| 3,035,617 A | 5/1962 | Breitenstein | 141/349 |
| 3,795,262 A | 3/1974 | Post | |
| 3,976,110 A | 8/1976 | White | 141/346 |
| 4,069,947 A | 1/1978 | Oakes | 222/5 |
| 4,644,982 A | 2/1987 | Hatch | 141/383 |
| 4,895,190 A | 1/1990 | Gillen | 141/1 |
| 4,995,417 A | 2/1991 | Naku | 137/231 |
| 5,301,723 A | 4/1994 | Goode | 141/82 |
| 5,305,925 A | 4/1994 | Vogel | 222/147 |
| 5,878,798 A | 3/1999 | Harris et al. | 141/346 |
| 5,975,164 A | 11/1999 | Whaley et al. | 141/351 |

FOREIGN PATENT DOCUMENTS

| | | |
|---|---|---|
| EP | 1 041 347 A3 | 10/2000 |
| EP | 1 041 347 A2 | 10/2000 |
| GB | 1 514 689 | 6/1978 |

OTHER PUBLICATIONS

Alternatives, "Choosing and Using Alternative Refrigerants for Motor Vehicle Air Conditioning", U.S. Environmental Protection Agency.

Motor Vehicle Air Conditioning, "Guidance on Retrofitting to HFC–134a", U.S. Environmental Protection Agency.

Alternatives, "MVAC Refrigerants Fitting Sizes & Label Colors", U.S. Environmental Protection Agency.

*Primary Examiner*—J. Casimer Jacyna
(74) *Attorney, Agent, or Firm*—Katten Muchin Rosenman LLP

(57) ABSTRACT

Apparatus has a body with a conduit defined therein. Body is mounted between, and connected to, a charging system containing pressurized fluid and a pressurized system. One apparatus has a retractable discharge tube inserted into a first end of the body. Once the body is connected to both the charging system and the pressurized system, a force is applied on the charging system toward the pressurized system. The force causes the charging system and the pressurized system to mate with the body urging the discharge tube to retract to release fluid into the conduit, and actuates the fitting to permit the fluid in the conduit to enter the pressurized system. Another apparatus has a manually deformable charging system and an adapter with a check valve to permit manual urging of fluid in the charging system through deformation of the charging system.

8 Claims, 13 Drawing Sheets

APPARATUS AND METHOD FOR URGING FLUID INTO A PRESSURIZED SYSTEM

This is a continuation of application Ser. No. 09/722,633, filed Nov. 28, 2000 now U.S. Pat. No. 6,561,237, which is incorporated herein by reference.

FIELD OF THE INVENTION

The present invention generally relates to an apparatus and method for urging fluid from a charging system to a pressurized system. More particularly, it relates to an apparatus and method for urging fluid from aerosol-type and non-aerosol-type charging systems to an air conditioning system.

BACKGROUND OF THE INVENTION

Routine maintenance of air conditioning systems often involves re-supplying an air conditioning unit with fluid which may have been lost as a result of a leak in the unit, for instance, a refrigerant, a lubricant or an additive.

One way of replenishing the supply of fluid in an air conditioning system involves injecting the fluid under pressure into the air conditioning unit by way of a charging system. Typically, an aerosol-type dispenser may be used as a charging system for injecting fluid into the air conditioning unit.

In this type of charging system, it is not uncommon to provide the dispenser with a fluid comprising a combination of refrigerant and dye. The dye is injected into the air conditioning unit along with the refrigerant, and is employed to detect leaks. A visual inspection of the air conditioning unit will reveal a leak at the location where dye is seen to be escaping the system. In some cases, a fluorescent dye, made visible by exposure to ultraviolet light, may be used to identify the leak.

Where an aerosol-type dispenser is used to inject fluid, one way of directing the contents of the dispenser into the air conditioning system is to employ a tap hose. Typically, a tap hose comprises an elongated tube having a first fitting at one end for connecting to the dispenser, and a second fitting at the opposite end for connecting to the air conditioning unit. The first fitting has female threading to connect to counterpart male threading provided on the top of the dispenser. The first fitting is also provided with a piercing device, such as a pin or a needle. The piercing device is mounted within the first fitting such that when the first fitting of the tap hose is mated with the dispenser, the piercing device breaks through the flat top of the dispenser to allow the contents thereof to escape through the tube. The flow of fluid through the tube is controlled by a control valve mounted to the tap hose.

The second fitting of the tap hose is generally compatible with the low-pressure side service port of the air conditioning unit. The service port of the air conditioning unit has a pressure-actuated valve. This type of valve is known to those skilled in the art. As the second fitting is mated with the service port of the air conditioning unit, a portion of the second fitting is urged against the valve of the service port thereby causing it to be actuated.

The typical installation of a tap hose is explained below. The control valve is closed. The first fitting is then screwed onto the top of the dispenser. The mating of the first fitting to the dispenser urges the piercing device to puncture the top of the dispenser and the contents of the dispenser are allowed to flow out from the dispenser and through the tube. The second fitting is then mated to the low-pressure side service port of the air-conditioning unit and the valve of the service port is actuated. Once both fittings have been properly mated, the control valve is opened and the fluid is allowed to flow unobstructed through the tube. The pressure in the dispenser being greater than the pressure in the air conditioning unit at the service port, the fluid is injected into the air conditioning system.

The use of a tap hose to effect the fluid refilling operation in an air conditioning unit has a number of drawbacks. The tap hose may be expensive to manufacture, particularly the tap hose component which comprises the piercing device. In some instances, the cost of manufacturing a tap hose may greatly exceed the cost of the aerosol-type dispenser and its contents. In such cases, the relative high cost of manufacturing would make disposal of the tap hose after a single use infeasible and uneconomical. Accordingly, it is more likely that a tap hose will be re-used for multiple injections of fluid. However, the components of the tap hose may not be particularly well-suited for multiple use. For instance, the pin or needle of the piercing device may be susceptible to being bent or broken and the tube may be subject to wear, resulting in leakage.

As previously discussed, typical charging systems employ aerosol-type dispensers to inject fluids into air conditioning units. Often times, these types of dispensers require the use of a propellant to effect the injection of the fluid. Other times, the fluid itself will be held under pressure within the dispenser. In some jurisdictions, the content and size of these dispensers may be subject to strict regulatory control. Accordingly, the dispensers may have to comply with minimum size requirements. The sale and use of propellants are often restricted and may even be prohibited in some jurisdictions.

Alternative apparatuses and methods for injecting fluids into air conditioning systems are desirable.

SUMMARY OF THE INVENTION

In an aspect of the invention, there is provided an apparatus for use with a charging system and a pressurized system for urging fluid from the charging system into the pressurized system. The charging system initially contains the fluid held under pressure. The charging system has a first pressure-actuated valve assembly. The first valve assembly has a first valve and a rigid discharge tube connected to the first valve. The discharge tube is retractable to actuate the first valve to release the fluid from the charging system. The pressurized system has a fitting and a second pressure-actuated valve assembly mounted within the fitting. The second valve assembly has a second valve and a pin connected to the second valve. The pin is retractable to actuate the second valve to allow entry of the fluid into the pressurized system. The apparatus has a rigid body with a longitudinal axis. The body has a first end about the axis for connecting the body to the charging system and a second end about the axis for connecting the body to the fitting of the pressurized system. The body is generally cylindrical about the axis. The body has an inner surface defining a conduit within the body. The conduit extends between the first and the second ends for fluid communication therebetween. The conduit at the first end is adapted to receive the discharge tube of the first valve assembly. The inner surface of the body is adapted to sealingly engage the discharge tube, and to stop the discharge tube in the conduit such that when the charging system is mated to the body the discharge tube is urged against the inner surface of the body thereby causing retraction of the discharge tube. The apparatus also has a rigid depressor for urging the pin to retract when the pressurized system is mated to the body. The depressor is mounted to the second end of the body clear of the conduit. The apparatus also has a resilient seal for discouraging leakage of fluid between the body and the fitting of the pressurized system. The seal is mounted to the body about the axis.

In another aspect of the invention, there is provided a kit for urging a fluid into a pressurized system. The pressurized system has a tubular fitting and a first pressure-actuated valve assembly mounted within the fitting. The first valve assembly has a first valve and a pin connected to the first valve. The pin is retractable to actuate the first valve to allow entry of the fluid into the pressurized system. The kit has a charging system containing the fluid held under pressure. The charging system has a second pressure-actuated valve assembly. The second valve assembly has a second valve and a rigid discharge tube connected to the second valve. The discharge tube is retractable to actuate the second valve to release the fluid from the charging system. The kit has an adapter. The adapter has a rigid body with a longitudinal axis. The body has a first end about the axis for connecting to the charging system and a second end about the axis for connecting to the fitting of the pressurized system. The body has an inner surface defining a conduit within the body. The conduit extends between the first and the second ends for fluid communication therebetween. The conduit is adapted to receive the discharge tube of the second valve assembly at the first end. The inner surface of the body is adapted to sealingly engage the discharge tube, and to stop the discharge tube in the conduit such that when the charging system is mated to the body the discharge tube is urged against the inner surface of the body thereby causing retraction of the discharge tube. The adapter also has a rigid depressor for urging the pin of the first valve assembly to retract when the pressurized system is mated to the body. The depressor is mounted to the second end of the body clear of the conduit. The adapter also has a seal for discouraging leakage of fluid between the body and the fitting when the pressurized system is connected to the body.

In yet another aspect of the invention, there is provided an apparatus for use with a charging system and a pressurized system for urging fluid from the charging system into the pressurized system. The charging system initially contains the fluid held under pressure. The charging system has a first pressure-actuated valve assembly. The first valve assembly has a first valve and a rigid discharge tube connected to the first valve. The discharge tube is retractable to actuate the first valve to release the fluid from the charging system. The pressurized system has a fitting and a second pressure-actuated valve assembly mounted within the fitting. The second valve assembly has a second valve and a pin connected to the second valve. The pin is retractable to actuate the second valve to allow entry of the fluid into the pressurized system. The apparatus has a rigid structure. The rigid structure has a first end for connecting to the charging system and a second end for connecting to the fitting of the pressurized system. The rigid structure also has a conduit defined within the structure which extends between the first end and the second end. The conduit is adapted to receive the discharge tube at the first end. The rigid structure also has a stop disposed within the conduit for urging the discharge tube of the first valve assembly to retract when the charging system is mated to the structure. The rigid structure also has a first seal disposed within the conduit for discouraging leakage of fluid between the structure and the discharge tube of the first valve assembly when the charging system is connected to the structure. The rigid structure also has a rigid depressor for urging the pin of the second valve assembly to retract when the pressurized system is mated to the structure. The depressor is mounted at the second end of the structure clear of the conduit so as not to prevent the egress of fluid therefrom. The rigid structure also has a resilient second seal mounted about the structure for sealing between the structure and the fitting when the structure is connected to the pressurized system.

In still another aspect of the invention, there is provided an apparatus for use with a charging system and a pressurized system for urging fluid from the charging system into the pressurized system. The charging system has a vessel containing fluid. The pressurized system has a tubular fitting and a pressure-actuated valve assembly mounted within the fitting. The valve assembly has a valve and a pin connected to the valve. The pin is retractable to actuate the valve to allow entry of the fluid into the pressurized system. The apparatus has a rigid structure. The rigid structure has a first end for connecting to the charging system and a second end for connecting to the fitting of the pressurized system. The rigid structure also has a conduit defined within the structure extending between the first end and the second end. The rigid structure also has a rigid depressor for urging the pin of the valve assembly to retract when the pressurized system is mated to the structure. The depressor is mounted at the second end of the structure clear of the conduit so as not to prevent the egress of fluid therefrom. The rigid structure also has a resilient seal mounted about the structure for sealing between the structure and the fitting when the structure is connected to the pressurized system.

In an additional aspect of the invention, there is provided a method of urging fluid from a charging system to a pressurized system. The charging system has a first pressure-actuated valve assembly operable to release pressurized fluid from the charging system. The pressurized system has a second pressure-actuated valve assembly operable to permit entry of the fluid into the pressurized system. The method comprises the steps of: connecting the charging system to a first end of an adapter; connecting the pressurized system to a second end of the adapter; and applying a force to the charging system toward the pressurized system to cause the charging system and the pressurized system to mate with the adapter thereby actuating the first valve assembly to release pressurized fluid into a conduit defined within the adapter, and actuating the second valve assembly to permit the fluid in the conduit to enter the pressurized system.

In a further additional aspect of the invention, there is provided a method of urging fluid from a charging system to a pressurized system. The charging system has a vessel containing fluid. The pressurized system has a pressure-actuated valve assembly operable to permit entry of the fluid into the pressurized system. The method comprises the steps of: operating a deep vacuum in the pressurized system for a predetermined period of time at a predetermined pressure; connecting the charging system to a first end of an adapter; connecting the pressurized system to a second end of the adapter; and applying a force to the adapter toward the pressurized system to cause the pressurized system to mate with the adapter thereby actuating the valve assembly to permit the vacuum to draw fluid from the charging system into the pressurized system through a conduit defined within the adapter.

BRIEF DESCRIPTION OF THE DRAWINGS

For a better understanding of the present invention and to show more clearly how it may be carried into effect, reference is now made, by way of example and not of limitation, to the accompanying drawings in which.

DETAILED DESCRIPTION OF ILLUSTRATIVE EMBODIMENTS OF THE INVENTION

Figure 1:
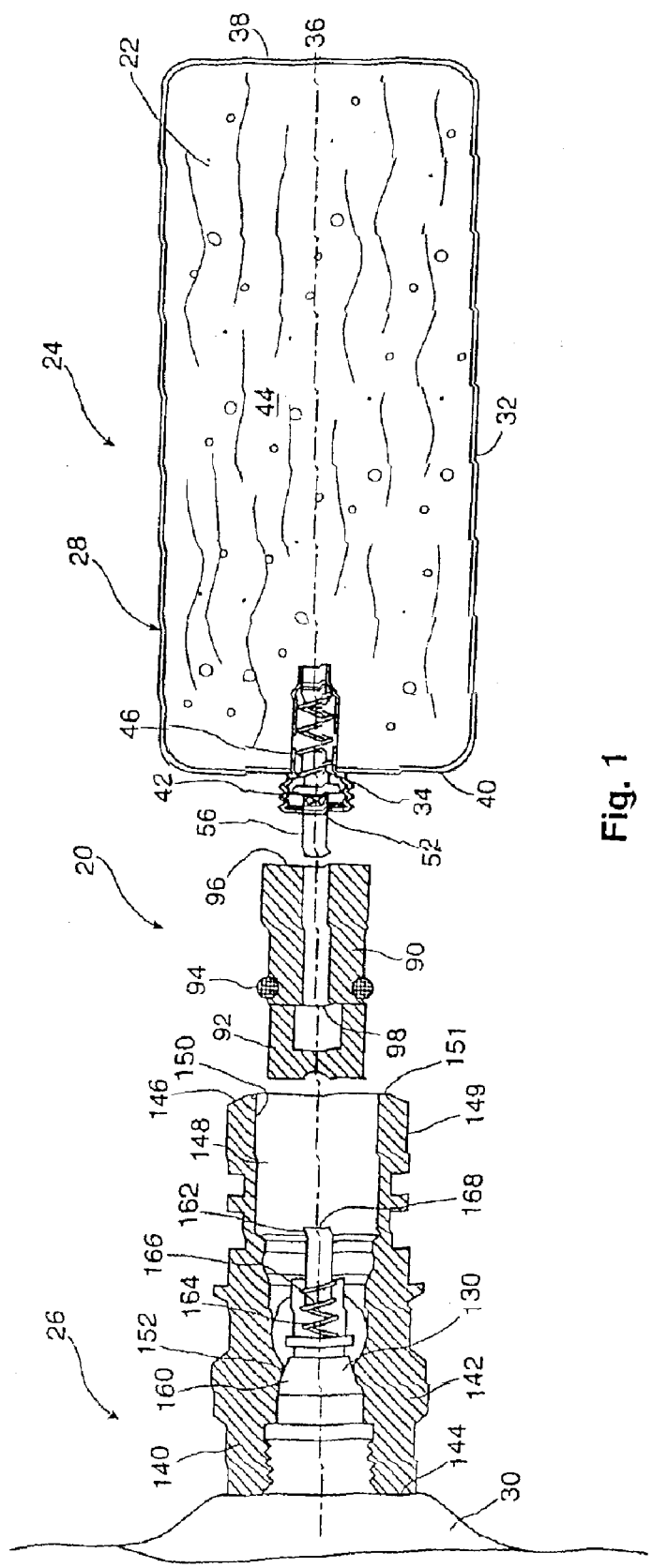
FIG. 1 is an exploded, cross-sectional view of a typical installation of an adapter according to a first embodiment of the present invention, showing the adapter disposed between a charging system and a pressurized system.

The description which follows, and the embodiments described therein, are provided by way of illustration of an example or examples of particular embodiments which reflect the principles of the present invention. These examples are provided for the purposes of explanation, and not of limitation, of those principles and of the invention. In the description which follows, like parts are marked throughout the specification and the drawings with the same respective reference numerals.

Figure 2:
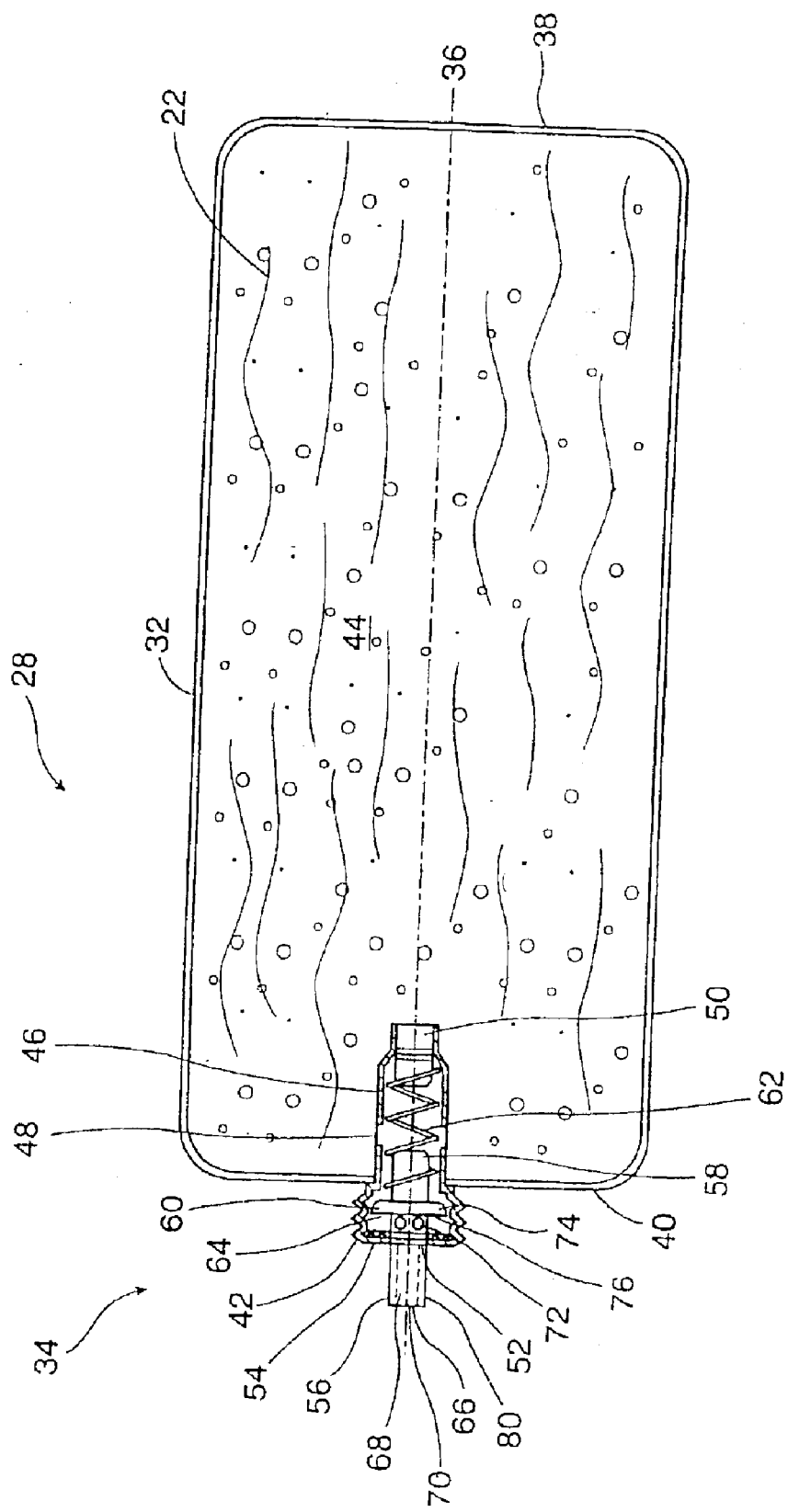
FIG. 2 is an enlarged, cross-sectional view of the charging system of FIG. 1.
Figure 3:
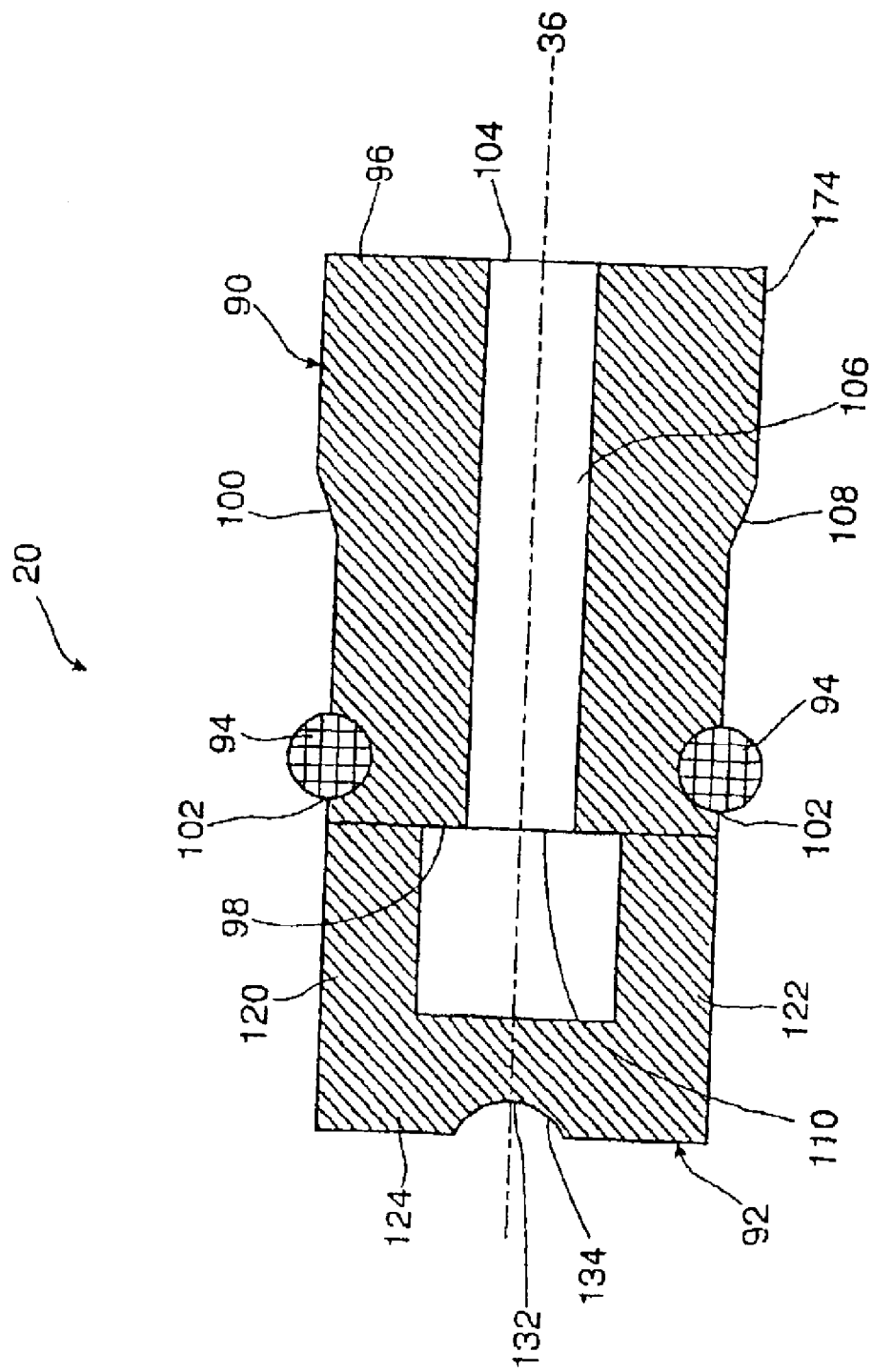
FIG. 3 is an enlarged, cross-sectional view of the adapter of FIG. 1.

Referring to FIGS. 1, 2 and 3, in a first embodiment of the invention, an apparatus in the form of an adapter 20 is used to flow a fluid 22, such as a refrigerant, a dye, or a combination of refrigerant and dye, from a charging system 24 to a pressurized system 26. Adapter 20 is mounted between charging system 24 and pressurized system 26 to urge the release of fluid 22 from charging system 24 for injection into pressurized system 26. In the illustrative embodiments of the invention described below, the pressurized system 26 is an air conditioning system 30. In the first, second, third and fourth embodiments of the invention, the charging system 24 is a pressure-actuated aerosol-type fluid dispenser, generally indicated as 28.

Fluid dispenser 28 may be of the type used conventionally for releasing aerosol-type products, such as air fresheners and paints. Referring to FIG. 2, fluid dispenser 28 comprises a container 32 and a valve assembly 34. Container 32 is generally cylindrical about a longitudinal axis 36, and extends from a distal or free end 38 to a proximal end 40 to terminate at a short, cylindrical threaded neck 42. A chamber 44 is defined in container 32 for holding a fluid 22.

Valve assembly 34 is mounted at proximal end 40 for connection to container 32 to control the release of fluid 22 from chamber 44. Valve assembly 34 is partially mounted within chamber 44 and seated in a generally, cylindrical valve retaining structure 46 which is secured to the body of container 32. Apertures, defined within valve retaining structure 46 and generally indicated as 48, allow valve retaining structure 46 to be in fluid communication with chamber 44. A tubular member 50 is secured to one end of valve retaining structure 46. A portion of valve assembly 34 extends externally of chamber 44 through an opening 52 defined within neck 42 of container 32. A resilient annular sealing member 54 is mounted about opening 52 to discourage leakage of fluid 22 from chamber 44.

Valve assembly 34 has a rigid, longitudinally extending, discharge tube or hollow stem 56, a biasing member seat 58, a seal 60, and a resilient biasing member, such as a spring 62, seated between biasing member seat 58 and tubular member 50.

Discharge tube 56 has a proximal end 64 which is carried within valve retaining structure 46 and a distal or free end 66 which stands proud of proximal end 40 of container 32, externally of chamber 44. Discharge tube 56 is mounted so as to extend through opening 52 of neck 42 and sealingly engage sealing member 54. At proximal end 64, discharge tube 56 is joined to valve 60. An internal longitudinal conduit 68 defined within discharge tube 56, extends from proximal end 64 to terminate at an outlet 70 at free end 66. Discharge tube 56 also has flow through openings 72 adjacent proximal end 64 which give access to conduit 68 from chamber 44. When valve assembly 34 is actuated by pressing discharge tube 56 toward distal end 38 of container 32, fluid 22 from chamber 44 may be permitted to flow through openings 72 into conduit 68 to finally exit at outlet 70, as will be explained in greater detail below.

Valve 60 has an annular flange member 74 which extends radially outwards from discharge tube 56 at proximal end 64. Flange member 74 may be integrally formed with discharge tube 56. Flange member 74 has a sealing surface 76 for abutting sealing member 54. Sealing surface 76 extends in a direction generally transverse to discharge tube 56. Biasing member seat 58 connects to valve 60 and comprises a generally narrow portion 78 which extends longitudinally in the direction of free end 38 of container 32. Longitudinal portion 78 is provided for mounting spring 62.

Spring 62 is disposed longitudinally within valve retaining structure 46 and mounted between longitudinal portion 78 and tubular member 50 of valve retaining structure 46. Spring 62 is held in compression within valve retaining structure 46 such that, absent any superior counteracting force, it biases valve 60 against sealing member 54 effectively preventing release of fluid 22 from chamber 44.

As will be understood by those skilled in the art, the foregoing arrangement forms a spring-loaded valve mechanism, the actuation of which is now described below. Actuation of valve assembly 34 is accomplished by moving discharge stem 56 from a first position (not shown) to a second, retracted position 80 (shown in FIG. 2) within valve retaining structure 46. At the first position, flow through openings 72 of discharge tube 56 are located in opposed relation to sealing member 54 and are effectively obstructed by the latter. Fluid communication between chamber 44 and conduit 68 is thus prevented. Furthermore, sealing surface 76 of valve 60 is biased against sealing member 54 by spring 62 to discourage fluid 22 from seeping or escaping through opening 52 of neck 42 or into flow through openings 72. When a sufficient longitudinal force is applied against free end 38 of discharge tube 56, spring 62 is urged into a greater state of compression. Discharge tube 56 is urged to retract into container 32 and advance further into valve retaining structure 46 to occupy second position 80. In second position 80, flow through openings 72 are no longer obstructed and sealing surface 76 no longer abuts sealing member 54. Entering valve retaining structure 46 through apertures 48, fluid 22 of chamber 44 may now flow past flange member 74 to enter conduit 68 by way of flow through openings 72. Fluid 22 may then exit fluid dispenser 28 at outlet 70.

Although in the illustrative embodiment, valve assembly 34 employs a valve 60 to control the release of fluid 22 from container 32, it will be appreciated by those skilled in the art that other types of suitable pressure-actuated valves may be, used with appropriate modifications to achieve a functionally equivalent valve assembly. For instance, valve assembly 34 may utilize a ball valve (not shown) to form a pressure-actuated valve mechanism for the valve assembly.

Referring to FIG. 3, adapter 20 comprises a body 90, a rigid depressor 92 and a resilient, annular sealing member 94. Body 90 is generally cylindrical about longitudinal axis 36. Body 90 has a first end 96 for connecting to fluid dispenser 28 of FIGS. 1 and 2, and a second end 98 for connecting to air conditioning system 30. At a transition portion 100 located substantially mid-way between first end 96 and second end 98, body 90 tapers. A circumferential rebate, cut-out, or groove 102 defined about body 90 at a longitudinal station adjacent second end 98, is provided for locating sealing member 94. It is not absolutely necessary to provide rebate 102 if seal 94 is sufficiently tight on body 90 so that it does not easily fall off or move about the body 90; provided that the seal 94 remains in a location that allows the seal 94 to provide an effective seal between the adapter 20 and the pressurized system 26, as will be described herein.

Body 90 has a first opening 104 defined therein at first end 96 to give access to a conduit 106. Conduit 106 is defined by generally cylindrical inner surface 108 of body 90. Conduit 106 extends longitudinally from first end 96 to second end 98 to terminate at a second opening 110 defined within body 90, such that opposed ends 96 and 98 are in fluid communication with each other. First opening 104 is generally of a size to receive free end 66 of discharge tube 56 therewithin. The circumference of conduit 106 gradually narrows from end 104 to end 110, to allow for insertion of discharge tube 56 at end 104, while limiting the depth to which discharge tube 56 can be inserted into conduit 106 during connection of fluid dispenser 28 to adapter 20. When connecting fluid dispenser 28 to adapter 20, free end 66 may be urged to frictionally engage inner surface 108. The friction fit between free end 66 and inner surface 108 could create a seal to discourage leakage of fluid. In this manner, conduit 106 serves to seal against, to releasably retain and to stop discharge tube 56. The depth to which any particular discharge tube 56 is permitted to be inserted into adapter 20 will need to be matched against the requirements of the corresponding valve assembly 34 to permit opening and closing of valve assembly 34. At a minimum, the conduit 106 must perform stop and seal functions for any particular adapter.

It is possible to provide a conduit 106, for example, by utilizing a projection (not shown) against which the discharge tube 56 is stopped and sealed, while the adapter 20 is manually retained on the discharge tube 56.

Body 90 can be machined from plastic, aluminium, brass stock, or may be fashioned by injection moulding of a hard plastic, such as polypropylene or polycarbonate. Body 90 may also be formed from other suitable materials which are compatible with fluid 22.

Depressor 92 comprises a pair of opposed support arms 120 and 122 and a probe 124 extending therebetween, for actuating a valve assembly 130 of air conditioning system 30, while not obstructing the flow of fluid 22 from conduit 106. Depressor 92 is mounted to second end 98 of body 90. Support arms 120 and 122 are disposed on each side of second opening 110 and extend longitudinally in a direction away from second end 98 to join with probe 124. Probe 124 is carried sufficiently away from second opening 110 so as not to substantially obstruct the egress of fluid 22 from conduit 106. Probe 124 has an abutting surface 132 that engages valve assembly 130 of FIG. 1 when adapter 20 is mated to pressurized system 26. Abutting surface 132 is generally parallel to second end 98. A rounded groove 134 defined within abutting surface 132 and generally, centrally located therein, is provided to engage and center a pressure-actuation portion of valve assembly 130 during mating, as will be described further below. To facilitate manufacturing, depressor 92 can be integrally formed with body 90 and constructed of the same material.

Annular sealing member 94 is securely seated in circumferential groove 102 of body 90. Sealing member 94 tends to discourage leakage of fluid 22 as it is flowed through adapter 20 into pressurized system 26, in a manner that will be explained in greater detail below. Sealing member 94 may be an O-ring seal and may be made of neoprene. The use of a neoprene O-ring seal is advantageous because it tends to expand outwardly as it is compressed thus providing additional sealing surface. Also, it rebounds to its original position when compressive forces are removed thus reducing the tendency to stick to the surfaces that are compressing it. Neoprene has also been found to be suitable for use with fluorescent dyes typical in air conditioning applications. Those skilled in the art will recognize that other seals and sealing mechanisms may be used.

Typically, air conditioning system 30 has a high side service port and a low side service port by which refrigerant can be to introduced into system 30. In the illustrative embodiments of the present invention, the refrigerant is injected into air conditioning system 30 through a low side service port 140 because it possesses lower pressure characteristics. The example structure of service port 140 is now described.

Referring to FIG. 1, service port 140 has a tubular fitting 142 which is generally compatible for interfacing with adapter 20. Tubular fitting 142 has a first end 144 connected to air conditioning system 30 and a second end 146 for connecting to adapter 20. Tubular fitting 142 has an outer surface 149 and inner surface 150. A longitudinal passage 148 for carrying fluid 22 into air conditioning system 30, defined by inner surface 150, extends between first end 144 and second end 146. A rim 151 extends about the edge of second end 146.

Tubular fitting 142 houses valve assembly 130 within passage 148. At a predetermined longitudinal station within passage 148, a sealing surface 152 is mounted about inner surface 150 and located to co-operate with valve assembly 130 to control the flow of fluid 22 into air conditioning system 30. Valve assembly 130 has a valve 160, a stem, boss or pin 162 operable to actuate valve 160, a resilient biasing member, such as a spring 164, for urging valve 160 against sealing surface 152 of inner surface 150. Valve 160, actuating pin 162 and spring 164 are arranged in a manner known to those skilled in the art to form a pressure-actuated valve mechanism. Actuating pin 162 has a proximal end 166 which is joined to spring 164 and a distal or free end 168 which extends longitudinally toward second end 146 of tubular fitting 142.

Operation of valve assembly 130 is now described below. Actuation of valve assembly 130 is accomplished by moving actuating pin 162 from a first position (not shown) to a second, retracted position 170 within passage 148. At the first position, the valve 160 is biased against sealing surface 152 by spring 164 such that there is no fluid communication between first end 144 and second end 146 of tubular fitting 142. When a sufficient force is applied against free end 168 of actuating pin 162, spring 164 is urged into a greater state of compression. Actuating pin 162 is urged to retract into passage 148 in the direction of first end 144 and occupy second position 170. In second position 170, valve 160 no longer abuts sealing surface 152 and fluid communication is permitted between first end 144 and second end 148 of tubular fitting 142.

It has been found that existing service ports generally used in R134A air-conditioning systems have generally similar internal diameters on inner surface 150 between end 146 and pin 162. Accordingly, a single size for seal 94 can be utilized for most current air-conditioning system applications. As will be evident to those skilled in the art, different size seals 94 may be required for pressurized system 26 having alternate internal diameter service ports (not shown).

The preferred steps to complete a typical installation of adapter 20 to charging system 24 and pressurized system 26 to allow fluid 22 to be flowed from fluid dispenser 28 to air conditioning system 30, are now described. First, fluid dispenser 28 is connected to adapter 20. Discharge stem 56 is inserted into first opening 104 of body 90. Free end 66 of discharge stem 56 is urged into conduit 106 until it frictionally engages inner surface 108 and can be advanced no further without opening valve assembly 34. At this point, free end 66 is stopped in conduit 106 and a seal is formed.

Second, adapter 20 is connected to service port 140 of air conditioning system 30. Second end 98 of body 90 is inserted into passage 148 of tubular fitting 142. Annular sealing member 94 is compressed between inner surface 150 of tubular fitting 142 and body 90 and a seal is formed discouraging leakage therebetween. Probe 124 may abut actuating pin 162 of valve assembly 130, but it remains in its first position. Valve assembly 130 of tubular fitting 142 is not yet actuated. Alternatively, the above steps can be interchanged, however, it has been found to be easiest to perform the steps in this order.

At this point in the installation procedure, no fluid 22 is released from chamber 44 as valve assembly 34 of fluid dispenser 28 remains un-actuated. A longitudinal force is then applied by the user to container 32 of fluid dispenser 28 in the direction of air conditioning unit 30. The force urges adapter 20 to mate to fluid dispenser 28 and to mate to tubular fitting 142.

As part of the mating process, discharge tube 56 is urged to retract into container 32 to its second position 80. Spring 62 of valve assembly 34 is caused to compress. The retraction of discharge tube 56 actuates valve assembly 34 in the manner explained previously.

Also, depressor 92 of adapter 20 is urged further into passage 148 of tubular fitting 142 until transition portion 100 of body 90 extends into passage 148. This causes probe 124 to engage valve assembly 130. More specifically, abutting surface 132 is pushed against actuating pin 162 of valve assembly 130 and free end 168 of actuating pin 162 is received within rounded groove 134 of abutting surface 132. Spring 164 is urged to compress, thereby causing actuating pin 162 to retract to a second position 170. The retraction of pin 162 actuates valve assembly 130, as previously explained above.

Extended portion 179 of body 90 between transition portion 100 and end 104 has a loose fit in passage 148 to assist in stabilizing the adapter 20 to prevent excess lateral pressure on any one portion of the seal 94 or excess lateral movement of the adapter 20 during use. When in use, the adapter 20 projects from the passage 148 to allow removal in the event adapter 20 remains in passage 148 after the charging system 24 is removed.

While the valve assemblies 34 and 130 are open, fluid 22 is released from chamber 44 to travel through conduit 68 and exit at outlet 70 into conduit 106 of body 90, and fluid 22 travelling in conduit 106 is permitted to flow through passage 148 of tubular fitting 142, beyond valve 160, into air conditioning system 30. As the pressure in chamber 44 of fluid dispenser 28 is greater than the pressure at service port 140 of air conditioning system 30, fluid 22 is injected into the air conditioning system 30.

In the first embodiment of the invention, leakage of fluid 22 between adapter 20 and service port 140, is discouraged by a seal formed between the inner surface 150 of tubular fitting 142 and body 90. However, it is possible to discourage such leakage by forming a seal between the body of the adapter and another surface of tubular fitting 142. In a second embodiment of the invention, to be described below, a seal is formed between the body of an adapter and the outer surface 149 of tubular fitting 142. In a third embodiment of the invention, also to be described below, a seal is formed between the body of an adapter and rim 151 of tubular fitting 142.

Figure 4:
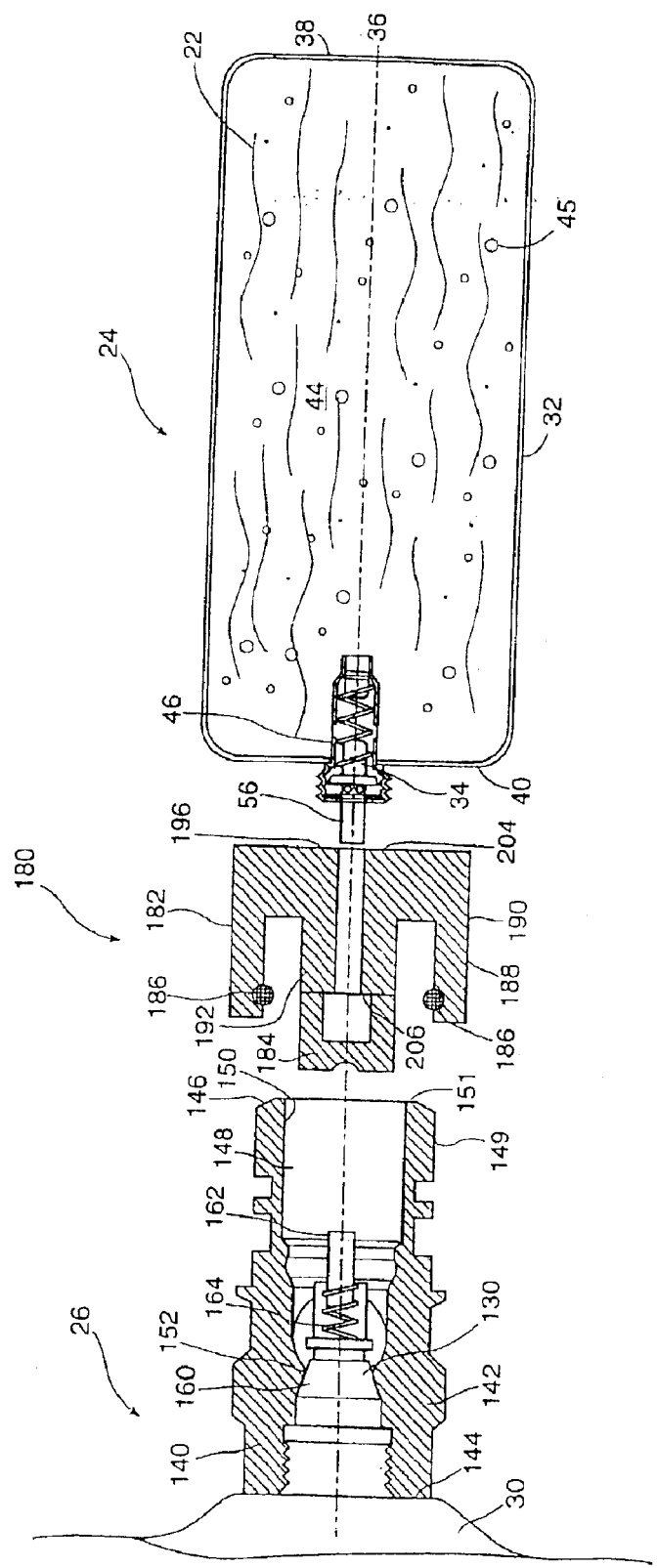
FIG. 4 is an exploded, cross-sectional view of a typical installation of an adapter according to a second embodiment of the present invention, showing the adapter disposed between a charging system and a pressurized system.
Figure 5:
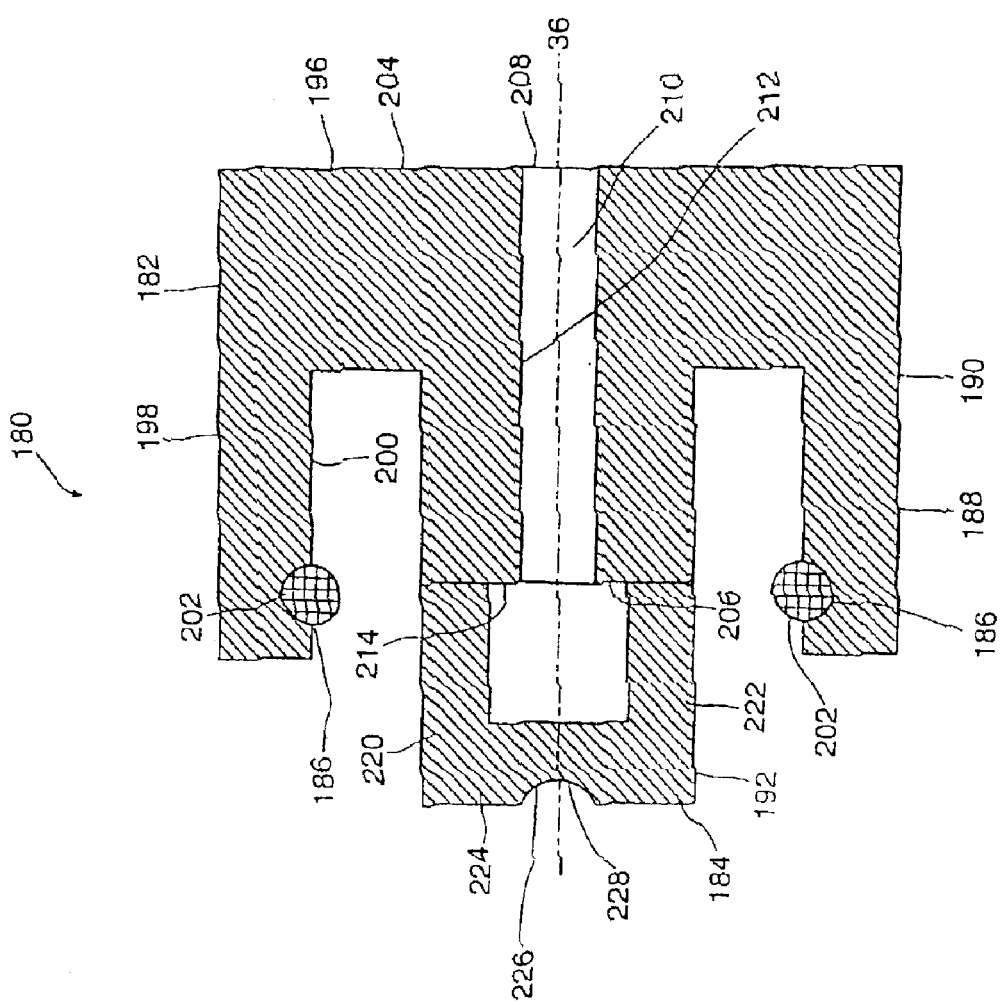
FIG. 5 is an enlarged, cross-sectional view of the adapter of FIG. 4.

Referring to FIGS. 4 and 5, in a second embodiment of the invention, an adapter is generally indicated as 180. The second embodiment is generally similar to the first embodiment, except as set out herein. Adapter 180 comprises a body 182, a rigid depressor 184 and a resilient, annular sealing member 186. Body 182 is generally cylindrical about longitudinal axis 36. Body 182 has a wall 188 which defines a hollow, outer cylinder 190. Mounted concentrically within outer cylinder 190 is a smaller, inner cylinder 192. Cylinders 190 and 192 are integrally formed one with the other and are joined at, and extend from, a common base 196. Base 196 is generally perpendicular to longitudinal axis 36. Outer cylinder 190 has an outer surface 198 and an inner surface 200 opposed to inner cylinder 192. A circumferential groove or rebate 202 is defined in inner surface 200 for locating annular sealing member 186.

Body 182 has a first end 204 for connecting to fluid dispenser 28 and a second end 206 for connecting to air conditioning system 30; first end 204 corresponding to base 196 and second end 206 corresponding to the end of inner cylinder 192 opposite base 196. Body 182 has a first opening 208 defined therein at first end 204 to give access to a conduit 210. Conduit 210 is defined by an inner surface 212 of inner cylinder 192. Conduit 210 extends longitudinally from first end 204 to second end 206 to terminate at a second opening 214 defined within inner cylinder 192, such that opposed ends 204 and 206 are in fluid communication with each other. First opening 208 is generally of a size to receive free end 66 of discharge tube 56. The circumference of conduit 210 gradually narrows from end 204 to end 206, to allow for insertion of discharge tube 56 at end 204, while limiting the depth to which discharge tube 56 can be inserted into conduit 210 during connection of the fluid dispenser 28 to adapter 180. When connecting fluid dispenser 28 to adapter 180, free end 66 may be urged to frictionally engage inner surface 212. The friction fit between free end 66 and inner surface 212 could create a seal to discourage leakage of fluid. In this manner, conduit 210 serves to seal against, to releasably retain and to stop discharge tube 56. The depth to which any particular discharge tube 56 is permitted to be inserted into adapter 180 will need to be matched against the requirements of the corresponding valve assembly 34 to permit opening and closing of valve assembly 34. At a minimum, the conduit 210 must perform stop and seal functions for any particular adapter.

It is possible to provide a conduit 210, for example, by utilizing a projection (not shown) against which the discharge tube 56 is stopped and sealed, while the adapter 180 is manually retained on the discharge tube 56.

Depressor 184 comprises a pair of opposed support arms 220 and 222 and a probe 224 extending therebetween, for actuating valve assembly 130 of air conditioning system 30. Depressor 184 is mounted to inner cylinder 192 at second end 206 of body 182. Support arms 220 and 222 are disposed on each side of second opening 210 and extend longitudinally in a direction away from second end 206 to join with probe 224. Probe 224 is sufficiently away from second opening 214 so as not to substantially obstruct the egress of fluid from conduit 210. Probe 224 has an abutting surface 226 that engages valve assembly 130 when adapter 180 is mated to air conditioning unit 30. Abutting surface 226 is generally parallel to second end 206. A rounded groove 228 defined within abutting surface 226 and generally, centrally located therein, is provided to receive a portion of valve assembly 130 during mating.

Annular sealing member 186 is mounted about inner surface 200 of outer cylinder 190 and seated in circumferential groove 202 defined therewithin. Similar to the groove 102 of adapter 20, the groove 202 may be omitted. Sealing member 186 tends to discourage leakage of fluid 22 as it is flowed through adapter 180 into service port 140. When adapter 180 is connected to tubular fitting 142 in the manner previously described above in relation to adapter 20, sealing member 186 is compressed between inner surface 200 of outer cylinder 190 and outer surface 149 of tubular fitting 142, and a seal is formed between tubular fitting 142 and body 182, thereby discouraging leakage therebetween. Sealing member 186 is generally similar to sealing member 94. Sealing member 186 may be an O-ring seal and may be made of neoprene. However, those skilled in the art will recognize that other seals and sealing mechanisms may be used. In this embodiment, it is particularly important to know the external diameter, or range of external diameters, of the tubular fitting 142 in order to size the seal 186 appropriately.

The procedure for completing a typical installation of adapter 180 to charging system 22 and pressurized system 24, is generally similar to that described earlier in relation to adapter 20.

Figure 6:
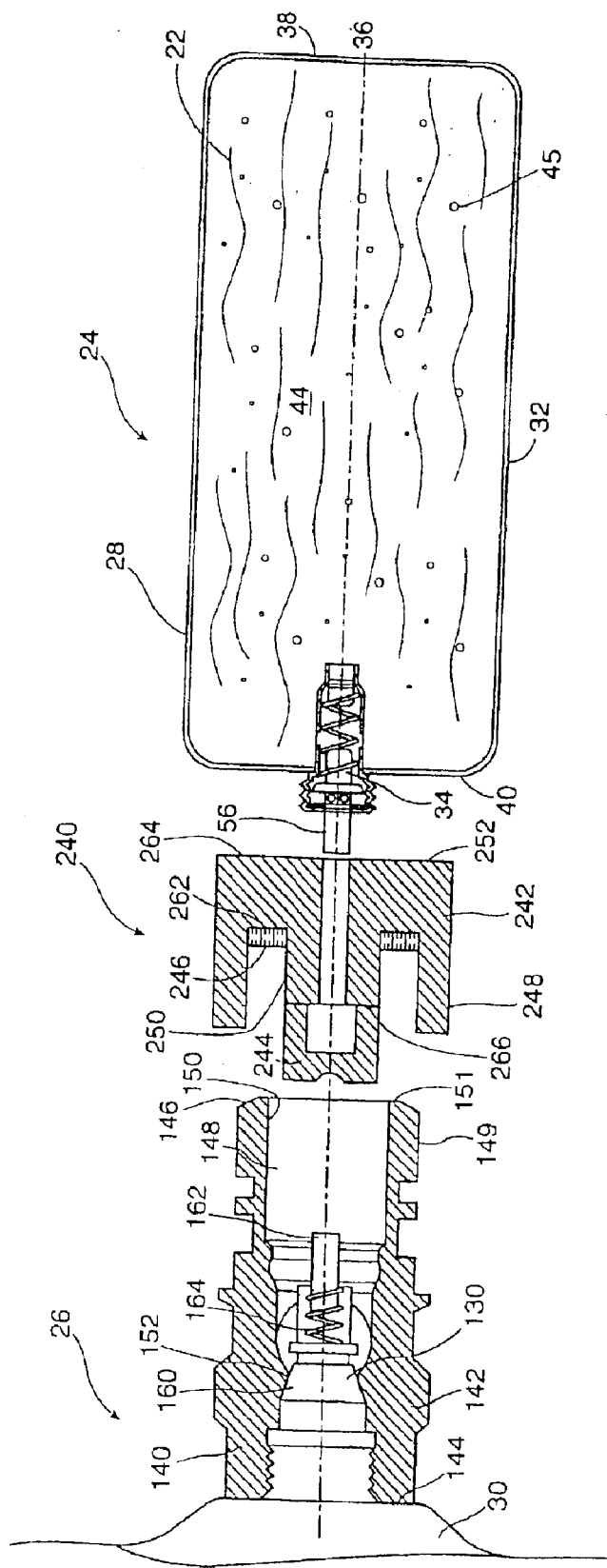
FIG. 6 is an exploded, cross-sectional view of a typical installation of an adapter according to a third embodiment of the present invention, showing the adapter disposed between a charging system and a pressurized system.
Figure 7:
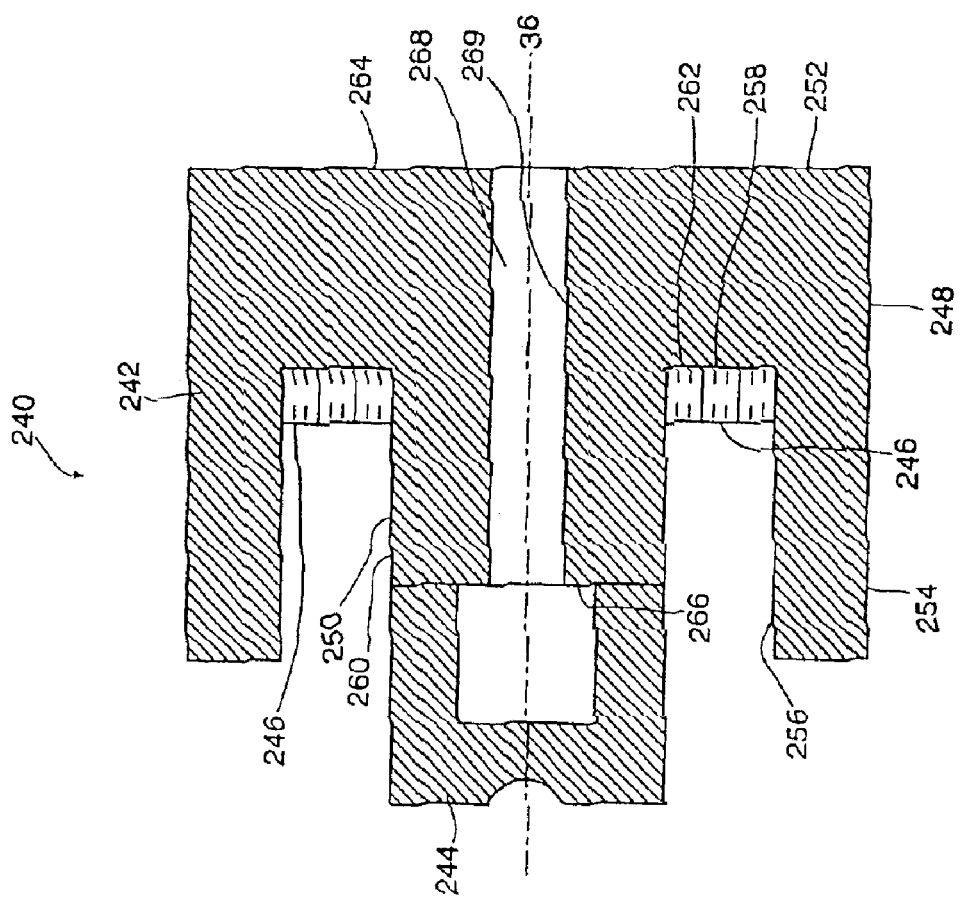
FIG. 7 is an enlarged, cross-sectional view of the adapter of FIG. 6.

Referring to FIGS. 6 and 7, in a third embodiment of the invention, an adapter is generally indicated as 240. Adapter 240 is of generally similar construction to adapter 180.

Adapter 240 has a body 242, a rigid depressor 244 and a resilient, annular sealing member 246. Body 242 has generally the same structure as body 182 described above. Body 242 has a hollow, outer cylinder 248 and a smaller, inner cylinder 250 mounted concentrically therewithin. Cylinders 248 and 250 are integrally formed one with the other and are joined at, and extend from, a common base 252. Base 252 is generally perpendicular to longitudinal axis 36. Outer cylinder 248 has an outer surface 254 and inner surface 256 opposed to inner cylinder 250. An annular surface 258, generally transverse of longitudinal axis 36, extends radially away from wall 260 of inner cylinder 250 to be bounded by inner surface 256 of outer cylinder 248. Annular surface 258 in co-operation with inner surface 256 and wall 260 defines a seat 262 for locating annular sealing member 246.

Body 242 also has a first end 264 for connecting to fluid dispenser 28 and a second end 266 for connecting to air conditioning unit 30; first end 264 corresponding to base 252 and second end 266 corresponding to the end of inner cylinder 250 opposite base 252. A conduit 268 not unlike conduit 210 described earlier, is defined within an inner surface 269 of body 242. Depressor 244 is generally of similar construction to depressor 184 described earlier. Depressor 244 is mounted to inner cylinder 250 at second end 266.

Annular sealing member 246 is mounted within seat 262. Sealing member 246 tends to discourage leakage of fluid 22 as it is flowed through adapter 240 into service port 140. When adapter 240 is connected to tubular fitting 142 in the manner previously described above in relation to adapter 20, sealing member 246 is urged against rim 151 of second end 146. Sealing member 246 is compressed against seat 262, and a seal is formed between tubular fitting 142 and body 242, thereby discouraging leakage therebetween. Sealing member 246 is a flat ring seal. However, those skilled in the art will recognize that other seals and sealing mechanisms may be used.

The procedure for completing a typical installation of adapter 240 to charging system 22 and pressurized system 24, is generally similar to that described earlier in relation to adapter 20. In this embodiment, it is particularly important to know the relationship, or range for relationships, between the pin 162 and the surface 151 to ensure that the sealing member 246 and adapter 240 are sized appropriately to maintain a seal.

In the first, second and third embodiments described herein, in order to keep charging system 24 mated to the adapters 20, 180, 240 described, a continuous force is applied to charging system 24 to urge it against the adapters 20, 180, 240. In a fourth embodiment which is to be described below, an adapter may be configured so as to permit the charging system 24 to be fastened to the adapter.

Figure 8:
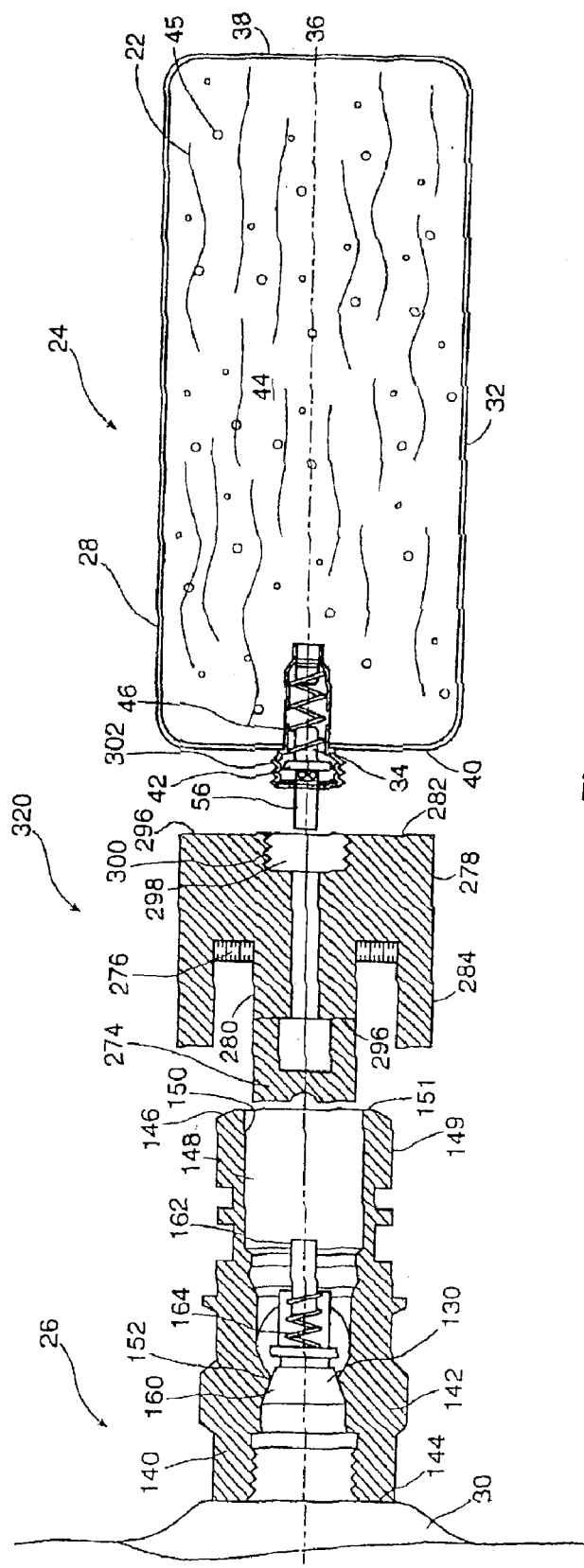
FIG. 8 is an exploded, cross-sectional view of a typical installation of an adapter according to a fourth embodiment of the present invention, showing the adapter disposed between a charging system and a pressurized system.
Figure 9:
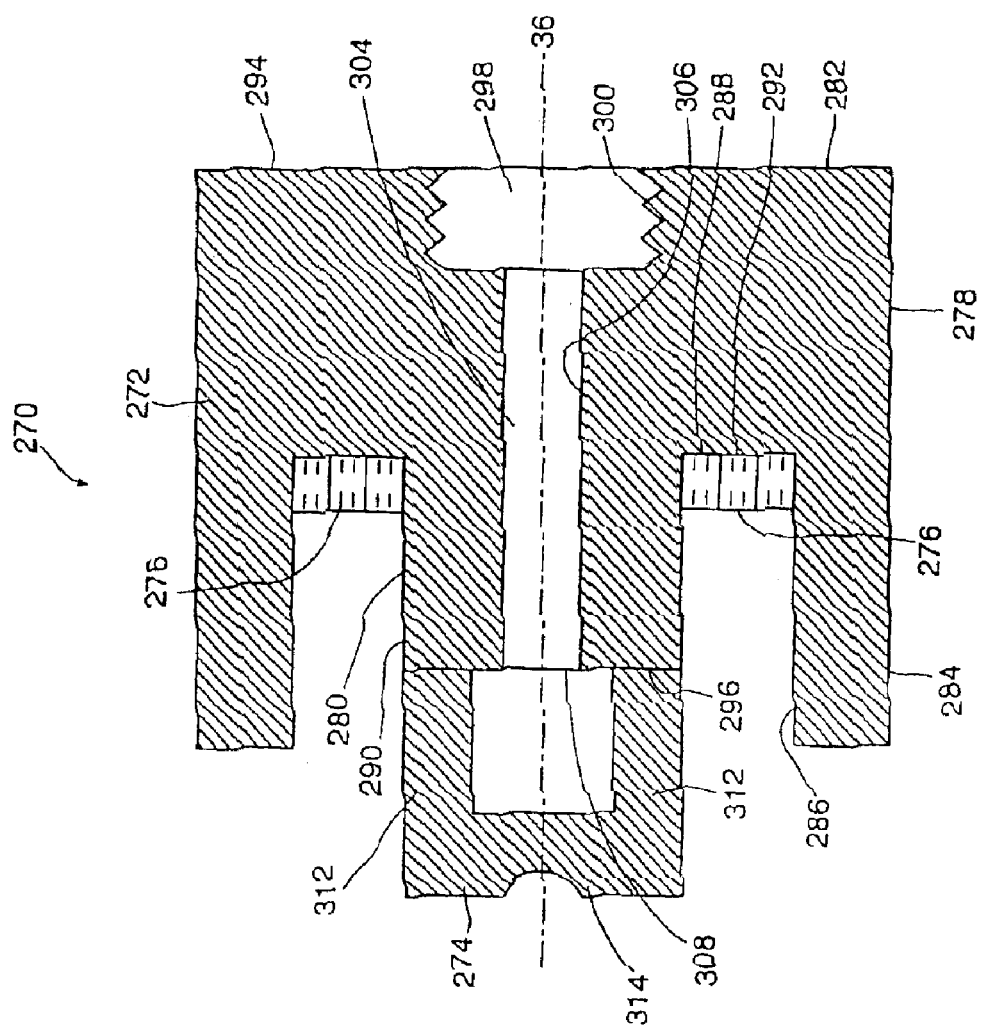
FIG. 9 is an enlarged, cross-sectional view of the adapter of FIG. 8.

Referring to FIGS. 8 and 9, in a fourth embodiment, an adapter is generally indicated as 270. Adapter 270 has a body 272, a rigid depressor 274 and a resilient, annular sealing member 276. Body 272 generally resembles body 242 described earlier, but is more elongated. Body 272 has a hollow, outer cylinder 278 and a smaller, inner cylinder 280 mounted concentrically therewithin. Cylinders 278 and 280 are integrally formed one with the other and are joined at, and extend from, a common base 282. Base 282 is generally perpendicular to longitudinal axis 36. Outer cylinder 278 has an outer surface 284 and inner surface 286 opposed to inner cylinder 280. An annular surface 288, generally transverse of longitudinal axis 36, extends radially away from wall 290 of inner cylinder 280 to be bounded by inner surface 286 of outer cylinder 278. Annular surface 288 in co-operation with inner surface 286 and wall 290 defines a seat 292 for locating annular sealing member 276.

Body 272 also has a first end 274 for connecting to fluid dispenser 28 and a second end 296 for connecting to air conditioning unit 30; first end 294 corresponding to base 282 and second end 296 corresponding to the end of inner cylinder 280 opposite base 282. A threaded bore 298 is defined within first end 294 to receive neck 42 of container 32. Bore 298 has female threading 300 for engaging counterpart male threading 302 on neck 42, to allow adapter 270 to be fastened to container 32. Bore 298 gives access to a conduit 304 defined by an inner surface 306 of inner cylinder 280. Conduit 304 extends longitudinally from the end of bore 298 to second end 296 to terminate at a second opening 308 defined within inner cylinder 280, such that opposed ends 294 and 296 are in fluid communication with each other. Conduit 304 is generally of a size to receive free end 66 of discharge stem 56 partially therewithin. As described earlier for conduit 106, conduit 304 gradually narrows to provide a seal and a stop for discharge tube 56.

Depressor 274 is generally of similar construction to depressor 184 described above. It has a pair of support arms 312 and a probe 314 extending therebetween. Depressor 274 is mounted to inner cylinder 280 at second end 296. Annular sealing member 276 is generally similar to sealing member 246 described above.

The preferred steps to complete a typical installation of adapter 270 to charging system 22 and pressurized system 24 to allow fluid 22 to be flowed from fluid dispenser 28 to air conditioning system 30, are now described.

First, fluid dispenser 28 is connected to adapter 270. Neck 42 is screwed partially into bore 298, but not so far as to actuate valve assembly 34. Second, adapter 270 is mounted to service port 140 of air conditioning system 30. Second end 296 of body 272 is partially inserted into passage 148 of tubular fitting 142 such that probe 314 of depressor 274 abuts actuating pin 162 of valve assembly 130, but does not urge pin 162 to actuate valve assembly 130. Once again, steps one and two are interchangeable. Sealing member 276 is urged against rim 151 of second end 146. Sealing member 276 is compressed against seat 292, and a seal is formed between tubular fitting 142 and body 272, thereby discouraging leakage therebetween.

A longitudinal force is then applied on adapter 270 in the direction of tubular fitting 142. Application of this force urges adapter 270 to mate to tubular fitting 142. Probe 314 is urged further against actuating pin 162 causing it to retract and actuate valve assembly 130.

While the longitudinal force is maintained, neck 42 is further screwed into bore 298 to mate the fluid dispenser 28 to the adapter 270. When fluid dispenser 28 is fully fastened to adapter 270, fluid 22 is released from chamber 44 to travel through conduit 304. Fluid 22 travels through passage 148 of tubular fitting 142, beyond seal valve 160, into air conditioning 30. As the pressure in chamber 44 of fluid dispenser 28 is greater than the pressure at service port 140 of air conditioning system 30, fluid 22 is injected into the air conditioning system 30.

The bore of the fourth embodiment, and the method utilized therein, may equally be applied to adapters 20, 180 and 240 of the first, second and third embodiments utilizing the principles described herein.

The illustrative embodiments have been described with reference to fluid 22, such as a refrigerant, a dye or a combination of refrigerant and dye. However, fluid 22 is not limited to these examples. Other fluids, such as lubricants, can be similarly flowed from a charging system 24 to a pressurized system 26 using the principles described herein.

Fluid 22 often comprises two or more elements, one such element may be an additive 368 that is desired to inject into a pressurized system; while another element may simply be a propellant 369. For instance, the additive 368 may be a dye for leak detection, a lubricant, a liquid desiccating agent, or an air conditioning sealant. Propellant 369 could be a refrigerant or may also be any one of the following: butane, carbon dioxide, compressed air, or the like.

It is desirable to have in place a system which encourages the injection of the entire supply of additive 368 into the pressurized system 26 before equalization of the pressure between charging system 24 and pressurized system 26 occurs. In such a case, it may be advantageous to isolate the additive 368 from the propellant 369. Alternative fluid dispensers which may be used in place of fluid dispenser 28, will now be described.

Figure 10:
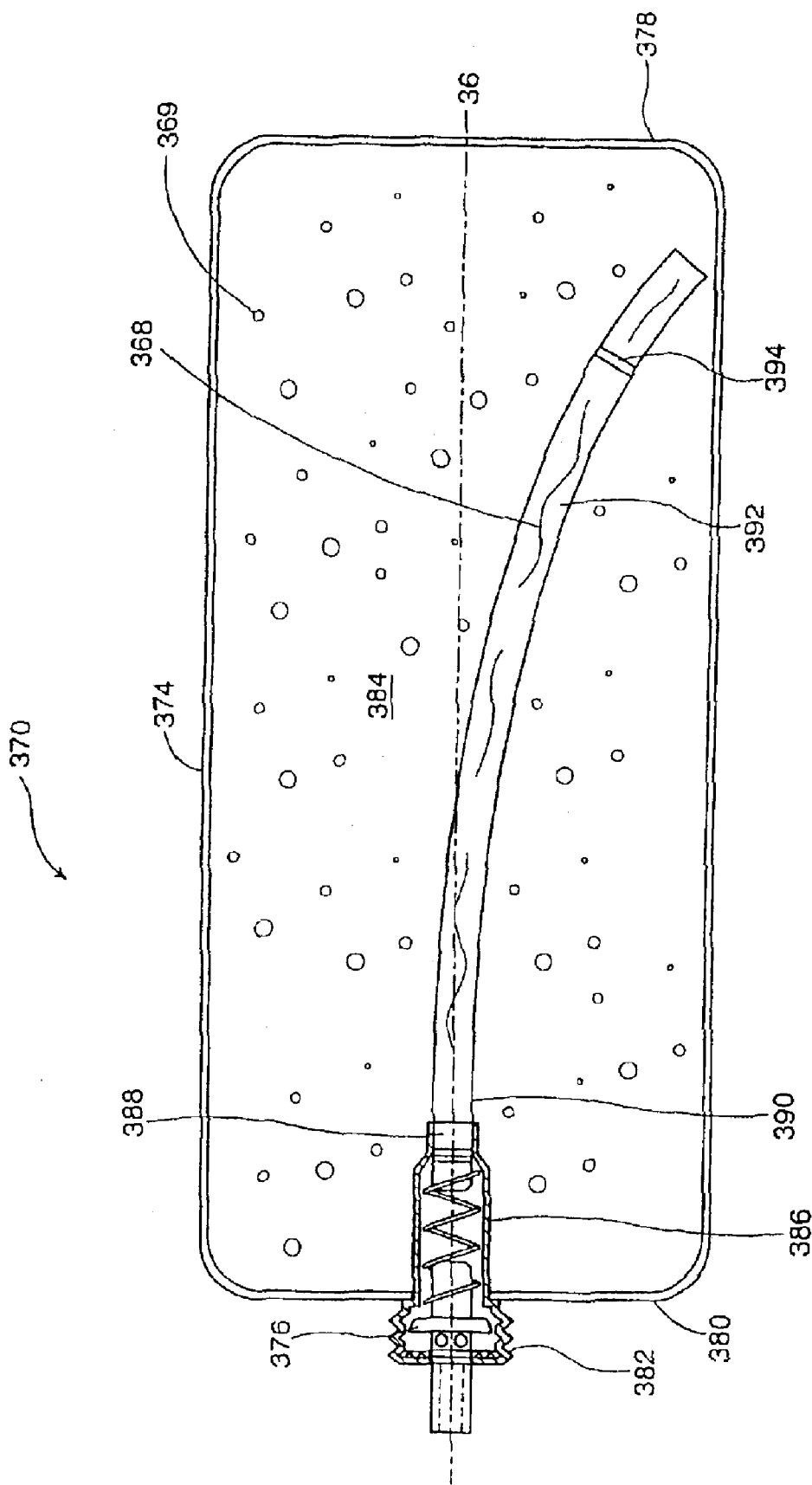
FIG. 10 is an enlarged, cross-sectional view of an alternative fluid dispenser to that shown in FIG. 2.

Shown in FIG. 10, is an alternative fluid dispenser, generally indicated as 370 in which additive 368 is kept apart from propellant 369. Fluid dispenser 370 is generally of similar construction to fluid dispenser 28 described earlier. Fluid dispenser 370 comprises a container 374 and a valve assembly 376. Container 374 is generally cylindrical about a longitudinal axis 36, and extends from a distal or free end 378 to a proximal end 380 to terminate at a short, cylindrical threaded neck 382. A chamber 384 for holding propellant 369 under pressure therewithin is defined in container 374.

Valve assembly 376 is mounted at proximal end 380 for connection to container 374 to control the release of dye 372 therefrom. Valve assembly 376 is partially mounted within chamber 384 and seated in a generally, cylindrical valve retaining structure 386 which is secured to the body of container 374. Valve retaining structure 386 is not in fluid communication with chamber 384. A tubular member 388, secured to one end of valve retaining structure 386, provides an attachment site for securing valve assembly 376 therewithin. A draw or intake tube 390 is mounted to tubular member 388 and extends longitudinally therefrom in the direction of free end 378 of container 374. Intake tube 390 is generally arcuate such that it curves away from the longitudinal axis 36 toward the walls of container 32. Intake tube 390 has a reservoir 392 defined therein for holding additive 368. A disc-like plunger 394, moveably mounted within reservoir 392, serves to isolate additive 368 from propellant 369 and tends to encourage the injection of substantially all of additive 368 into air conditioning system 30 when adapter 20 is mated to fluid dispenser 370 and service port 140. Valve assembly 376 is generally similar, both in construction and mode of operation, to valve assembly 34 described earlier.

When adapter 20 is mated to fluid dispenser 370 such that valve assembly 376 is actuated, propellant 369 thrusts plunger 374 toward tubular member 388. As plunger 394 advances within reservoir 392, additive 368 held in reservoir 392 is urged through valve assembly 376. Only additive 368 is released from fluid dispenser 370, the propellant 369 remaining trapped in container 374.

In other instances, where segregation of the additive 368 from propellant 369 is not required, it may still be desirable to provide a fluid dispenser with an intake tube, but no plunger. For example, if tubular fitting 142 of service port 140 is oriented horizontally, mating to adapter 20 occurs along a horizontal axis. Providing a fluid dispenser with an intake tube allows fluid 22 to be drawn into the valve assembly of the fluid dispenser, even if the level of fluid 22 within the chamber has fallen below the horizontal axis.

Figure 11:
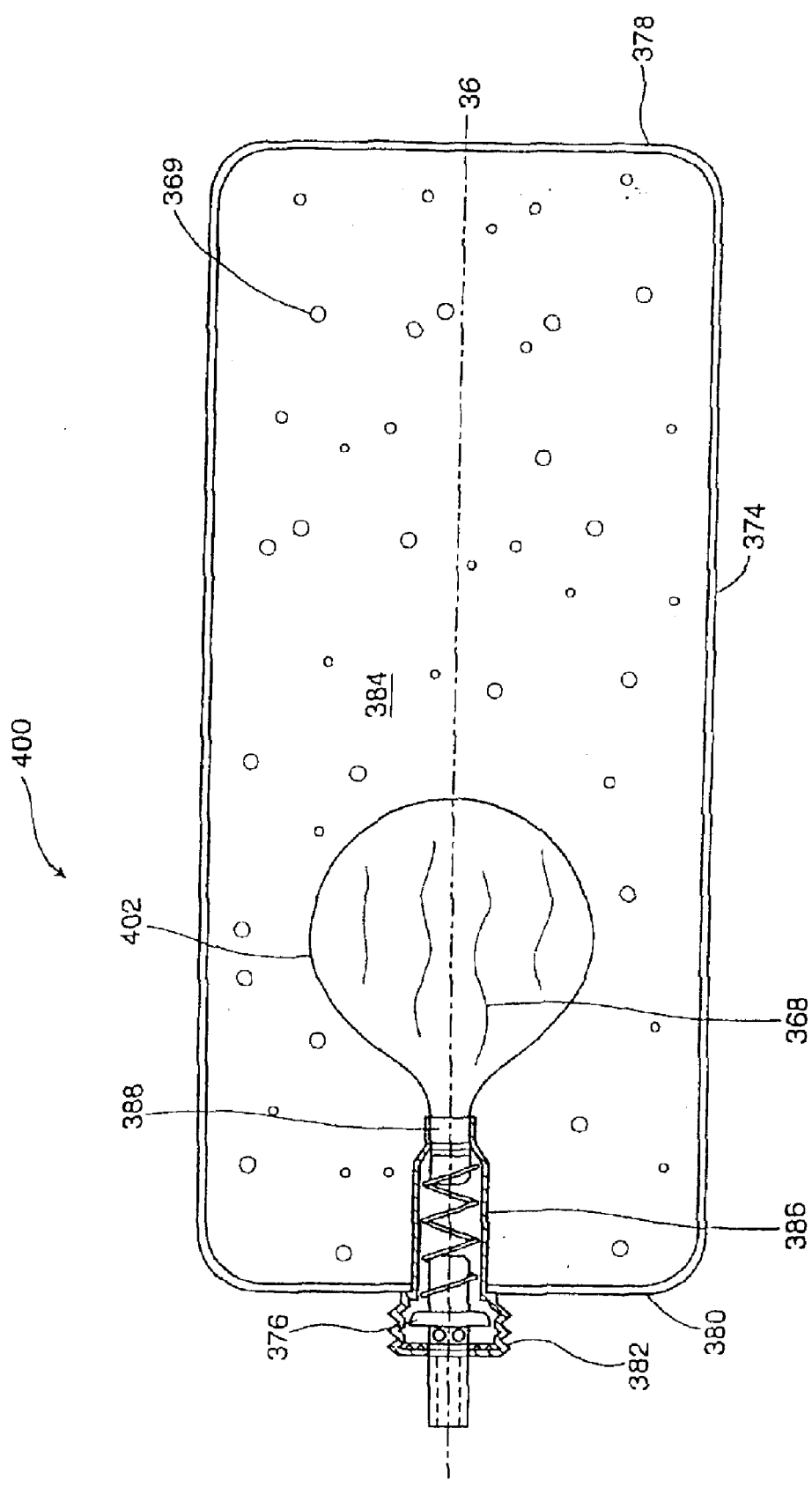
FIG. 11 is an enlarged, cross-sectional view of another alternative fluid dispenser to that shown in FIG. 2.

Alternatively, results similar to those obtained by using fluid dispenser 370 may be achieved without the use of an intake tube and plunger arrangement. In another alternative fluid dispenser, shown in FIG. 11 and generally indicated as 400, intake tube is replaced by a flexible, sac-like vessel or bladder 402 for containing additive 368. Bladder 402 is mounted to tubular member 338. When adapter 20 is mated to fluid dispenser 400 such that valve assembly 326 is actuated, propellant 369 squeezes bladder 402 causing additive 368 contained therein to be urged through valve assembly 376 and released from fluid dispenser 400.

Figure 12:
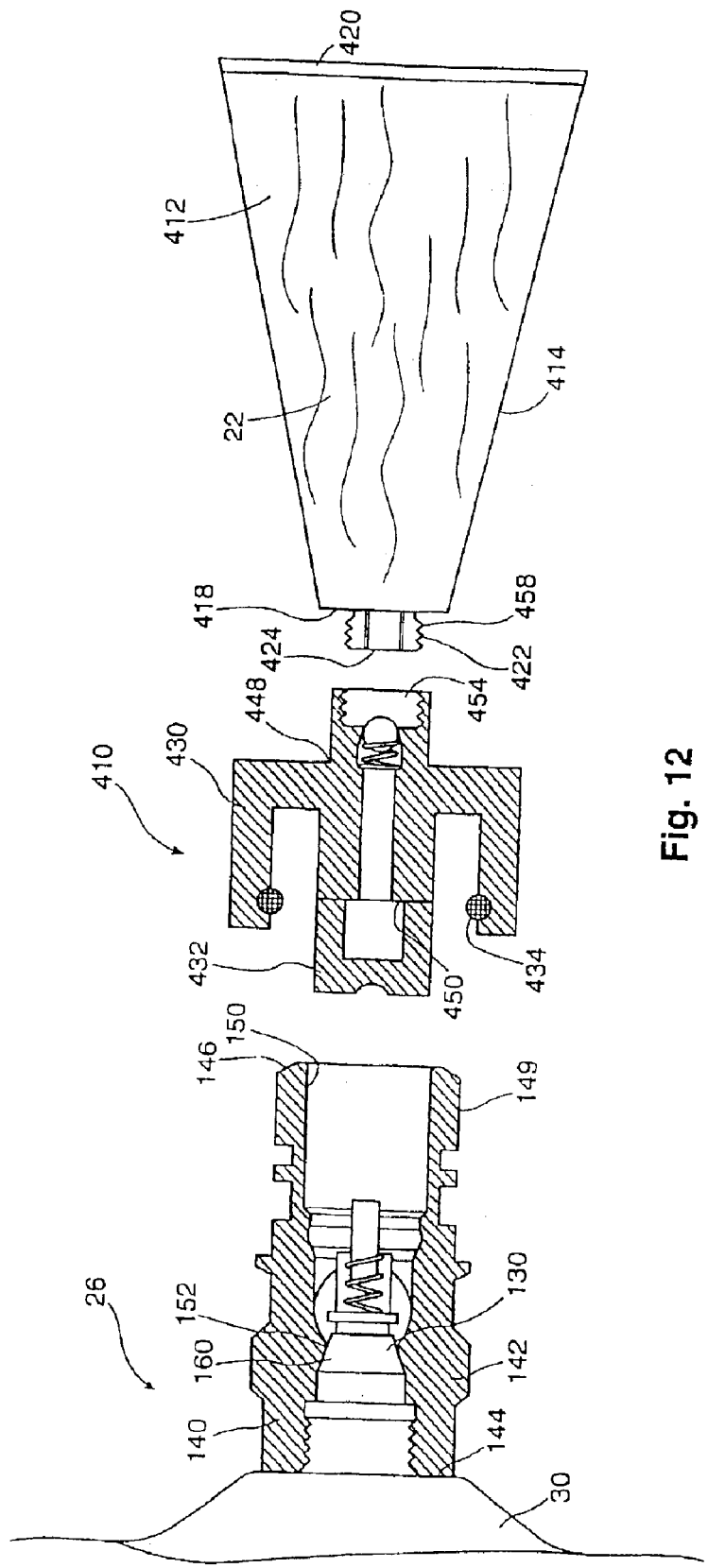
FIG. 12 is an exploded, cross-sectional view of a typical installation of an adapter according to a fifth embodiment of the present invention, showing the adapter disposed between a charging system and a pressurized system.
Figure 13:
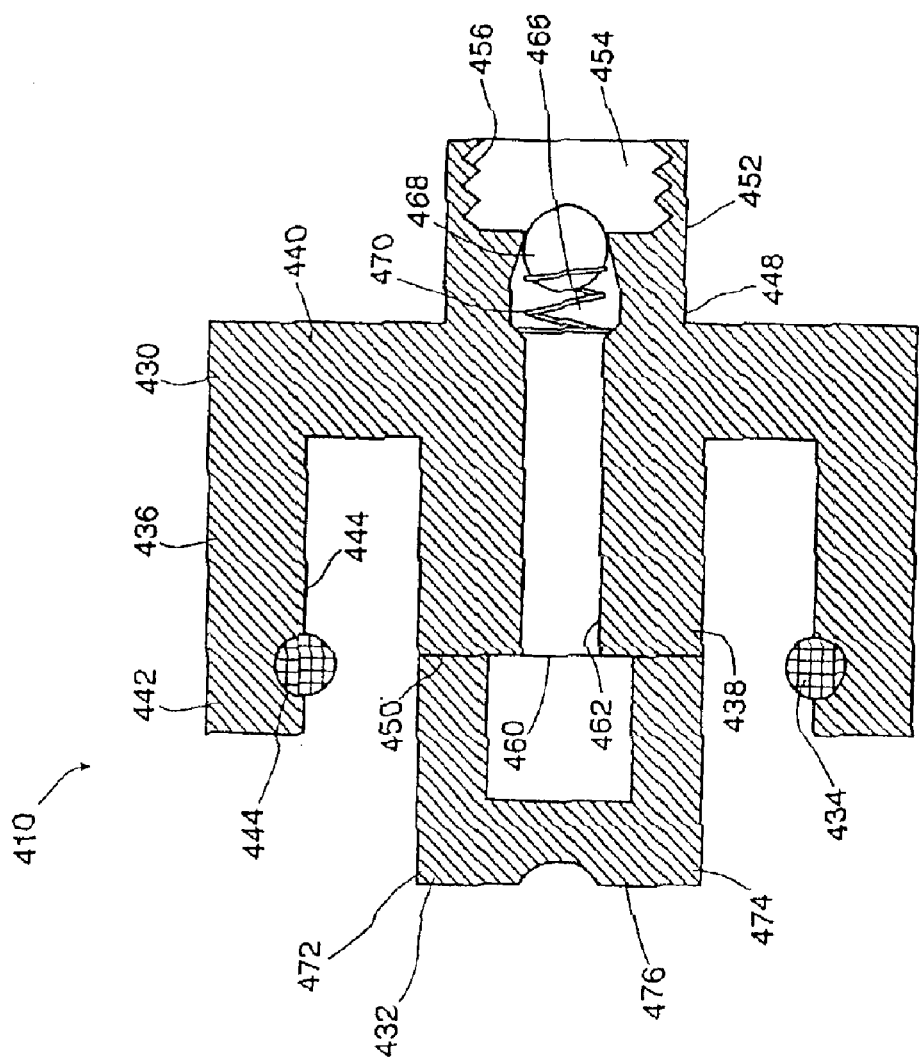
FIG. 13 is an enlarged, cross-sectional view of the adapter of FIG. 12.

Although, adapter 20, 180, 240, and 270 have been described for use with pressure-actuated aerosol-type fluid dispenser 28 or alternatively, with fluid dispensers 370 and 400, an adapter employing the principles described above can be used with a charging system whose contents are not held under pressure. Such an adapter would not require the use of a propellant to inject the fluid into the pressurized system 26. As will be explained in greater detail below, the fluid would be drawn from the charging system to the pressurized system 26 by a suction force generated by a deep vacuum in the air conditioning system 30. Referring now to FIGS. 12 and 13, in a fifth embodiment, there is shown an adapter 410 for urging a fluid from a non-aerosol type charging system 412 to air conditioning system 30.

Charging system 412 has a wall member 414 having a generally circular or oval cross-section, which extends between a first end 418 and a second end 420 to define a tube-like vessel or container 416. At first end 418, container 416 terminates in a threaded neck 422 having an aperture 424. In an alternative embodiment (not shown), aperture 424 may be covered with a foil seal to prevent air from coming into contact with the contents of container 416.

At second end 420, wall member 414 is collapsed onto itself and sealed. Container 416 is generally trapezoidal in shape and resembles a tube of the type used to dispense toothpaste or the like. Accordingly, wall member 414 is flexible and deformable and may even be resilient. However, while it is preferred that wall member 414 be flexible, it is not essential; wall member 414 may be rigid. Wall member 414 may be made of metal or plastic. A transparent plastic may also be used in the construction of wall member 414 for viewing the contents of container 416 as fluid is flowed from charging system 412 to air conditioning system 30.

Adapter 410 has a body 430, a rigid depressor 432 and a resilient, annular sealing member 434. Body 430 is generally similar to body 182 of adapter 180 described earlier, except as set out herein. Body 430 has a hollow, outer cylinder 436 and a smaller, inner cylinder 438 mounted concentrically therewithin. Cylinders 436 and 438 are integrally formed one with the other and are joined at, and extend from, a common base 440. Outer cylinder 436 has an outer surface 442 and an inner surface 444 opposed to inner cylinder 438. A circumferential groove or rebate 446 is defined in inner surface 444 for locating annular sealing member 434.

Body 430 has a first end 448 for connecting to charging system 412 and a second end 450 for connecting to air conditioning unit 30. At a first end 448, a narrow projection 452 extends longitudinally away from body 430. Projection 452 has a threaded bore 454 defined therewithin to receive neck 422 of container 416. Bore 454 has female threading 456 for engaging counterpart male threading 458 on neck 422, to allow container 416 to be fastened to adapter 410.

Bore 454 gives access to a narrower, conduit 460 defined within body 430. More specifically, conduit 460 is substantially defined by an inner surface 462 of inner cylinder 438. Conduit 460 extends longitudinally from first end 448 to second end 450 to terminate at an opening 464 defined within inner cylinder 438, such that opposed ends 448 and 450 are in fluid communication with each other. Mounted at the mouth of conduit 460, proximate first end 448, is a check valve 466 for discouraging back flow of fluid from air conditioning system 30 to charging system 412. Check valve 466 comprises a ball valve 468 and a spring 470 for biasing valve 468 against the mouth of the conduit 460 to obstruct flow in the direction of the charging system 412. Those skilled in the art will recognize that other check valve mechanisms may be used.

In an alternative embodiment (not shown), where container 416 is a foil-sealed container as discussed above, adapter 410 may be provided with a piercing device for puncturing the seal of the container when the adapter is connected to the charging system.

Depressor 432 is generally of similar construction to depressor 184 described above. It has a pair of support arms 472 and 474 and a probe 476 extending therebetween. Depressor 432 is mounted to inner cylinder 438 at second end 450 of body 430. Annular sealing member 434 forms a seal in much the same fashion as sealing member 186 previously described. Alternatively, adapter 410 can be provided with a sealing member which performs the sealing function in a generally similar manner to sealing member 94 or sealing member 246.

In an alternative embodiment (not shown), it is possible for adapter 410 to be connected to container 416 by way of a hose. In such an embodiment, the hose could be mounted between the body 430 and the container 416 and releasably fastened thereto.

The preferred steps to complete a typical installation of adapter 410 to charging system 412 and pressurized system 26 to allow fluid to be flowed from container 416 to air conditioning system 30, are now described.

Prior to installing adapter 410 to charging system 412 and pressurized system 26, air conditioning system 30 is operated under a deep vacuum. The pressure of the deep vacuum and the length of time for which the air conditioning system 30 will be operated under the deep vacuum will depend on the industry standards for the type of air conditioning system 30 employed. Preferably, the air conditioning system 30 is operated under a deep vacuum at a pressure of 29 inches of Hg, for a duration of 20 minutes.

Subsequent to the production of the vacuum, charging system 412 is connected to adapter 410. More specifically, neck 422 of container 416 is screwed into bore 454 of body 430 and a seal is formed between the adapter 410 and the charging system 412. Adapter 410 is then mounted to service port 140 of air conditioning system 30. Second end 450 of body 430 is inserted into passage 148 of tubular fitting 142. Sealing member 434 is compressed between inner surface 444 of outer cylinder 436 and outer surface 149 of tubular fitting 142 thus forming a seal between body 430 and fitting 142.

Once adapter 410 is connected to the charging system 412 and the air conditioning system 30, a longitudinal force is applied to adapter 410 in the direction of tubular fitting 142, thereby urging adapter 410 to mate to tubular fitting 142. Probe 476 is forced against actuating pin 162 causing it to retract and actuate valve assembly 130. Once valve assembly 130 is actuated, the vacuum under which the service port 140 is held causes a suction force to be applied on ball valve 468. Ball valve 468 is urged against spring 470 thereby compressing it. As a result, ball valve 468 is displaced from its position obstructing the mouth of conduit 460. Fluid from charging system 412 is then drawn from container 416 into conduit 460 and flowed through passage 148 of tubular fitting 142, beyond seal valve 160, into air conditioning system 30. In cases where the air conditioning system 30 operates at a particularly low pressure, fluid may be further urged to flow from the charging system 412 by manually squeezing flexible wall member 414 of container 416.

The foregoing method of urging fluid from the charging system 412 to the air conditioning unit 30 is particularly convenient because, often times, servicing an air conditioning unit will involve operating the unit under a deep vacuum. This operation tends to encourage the elimination or removal of trapped air and moisture in the system. By using the suction force produced by the deep vacuum to flow the fluid into the pressurized system, the need for propellant-based charging systems has been obviated.

Utilizing the principles described above, vacuum-based injection can be implemented with adapters 20, 180, 240, and 270 (which do not have a check valve similar to check valve 466) in instances where the risk back flow from the pressurized system 26 is limited or would not have adverse consequences. In these instances, adapters 20, 180, 240, and 270 and charging system 412 could be adapted to provide appropriate sealing means to prevent air from being drawn into the pressurized system 26.

It will be understood by those skilled in the art that the foregoing description is made with reference to illustrative embodiments of the invention and that other embodiments employing the principles of the invention may be envisaged, all of which fall within the spirit and scope thereof as defined by the following claims.

We claim:

1. An apparatus for use with a charging system and a pressurized system for urging fluid from the charging system into the pressurized system, the charging system initially containing the fluid held under pressure, the charging system having a first pressure-actuated valve assembly, the first valve assembly having a first valve and a rigid discharge tube connected to the first valve, the discharge tube being retractable to actuate the first valve to release the fluid from the charging system, the pressurized system having a fitting and a second pressure-actuated valve assembly mounted within the fitting, the second valve assembly having a second valve and a pin connected to the second valve, the pin being retractable to actuate the second valve to allow entry of the fluid into the pressurized system, the apparatus comprising:

a rigid body with a longitudinal axis having a first end about the axis for connecting the body to the charging system and a second end about the axis for connecting the body to the fitting of the pressurized system; the body being generally cylindrical about the axis;

the body having an inner surface defining a conduit within the body; the conduit extending between the first and the second ends for fluid communication therebetween;

the conduit at the first end being adapted to receive the discharge tube of the first valve assembly;

the inner surface of the body being adapted to sealingly engage the discharge tube, and to stop the discharge tube in the conduit such that when the charging system is mated to the body the discharge tube is urged against the inner surface of the body thereby causing retraction of the discharge tube;

a rigid depressor for urging the pin to retract when the pressurized system is mated to the body; the depressor being mounted to the second end of the body clear of the conduit; and a resilient seal for discouraging leakage of fluid between the body and the fitting of the pressurized system; the seal being mounted to the body about the axis, wherein the body has a circumferential groove defined therein for locating the seal; the groove being disposed between the first end and the second end of the body; the seal being seated within the groove.

2. An apparatus for use with a charging system and a pressurized system for urging fluid from the charging system into the pressurized system, the charging system initially containing the fluid held under pressure, the charging system having a first pressure-actuated valve assembly, the first valve assembly having a first valve and a rigid discharge tube connected to the first valve, the discharge tube being retractable to actuate the first valve to release the fluid from the charging system, the pressurized system having a fitting and a second pressure-actuated valve assembly mounted within the fitting, the second valve assembly having a second valve and a pin connected to the second valve, the pin being retractable to actuate the second valve to allow entry of the fluid into the pressurized system, the apparatus comprising:

a rigid body with a longitudinal axis having a first end about the axis for connecting the body to the charging system and a second end about the axis for connecting the body to the fitting of the pressurized system; the body being generally cylindrical about the axis;

the body having an inner surface defining a conduit within the body; the conduit extending between the first and the second ends for fluid communication therebetween;

the conduit at the first end being adapted to receive the discharge tube of the first valve assembly;

the inner surface of the body being adapted to sealingly engage the discharge tube, and to stop the discharge tube in the conduit such that when the charging system is mated to the body the discharge tube is urged against the inner surface of the body thereby causing retraction of the discharge tube;

a rigid depressor for urging the pin to retract when the pressurized system is mated to the body; the depressor being mounted to the second end of the body clear of the conduit; and a resilient seal for discouraging leakage of fluid between the body and the fitting of the pressurized system; the seal being mounted to the body about the axis, wherein:

the body has a wall defining an outer cylinder, and an inner cylinder mounted concentrically within the outer cylinder; the outer cylinder sharing a common base with the inner cylinder; the inner cylinder being formed integrally with the outer cylinder;

the seal being mounted about the inner cylinder.

3. The apparatus of claim 2 wherein the outer cylinder has an outer surface and an inner surface; the inner surface of the outer cylinder having a groove defined therein for locating the seal; the seal being seated within the groove.

4. The apparatus of claim 3 wherein:

the fitting is a tubular fitting having an outer surface; and the seal is compressible between the inner surface of the outer cylinder and the outer surface of the fitting when the body is connected to the fitting.

5. The apparatus of claim 3 wherein the groove is located proximate the second end of the body.

6. An apparatus for use with a charging system and a pressurized system for urging fluid from the charging system into the pressurized system, the charging system initially containing the fluid held under pressure, the charging system having a first pressure-actuated valve assembly, the first valve assembly having a first valve and a rigid discharge tube connected to the first valve, the discharge tube being retractable to actuate the first valve to release the fluid from the charging system, the pressurized system having a fitting and a second pressure-actuated valve assembly mounted within the fitting, the second valve assembly having a second valve and a pin connected to the second valve, the pin being retractable to actuate the second valve to allow entry of the fluid into the pressurized system, the apparatus comprising:

a rigid body with a longitudinal axis having a first end about the axis for connecting the body to the charging system and a second end about the axis for connecting the body to the fitting of the pressurized system; the body being generally cylindrical about the axis;

the body having an inner surface defining a conduit within the body; the conduit extending between the first and the second ends for fluid communication therebetween;

the conduit at the first end being adapted to receive the discharge tube of the first valve assembly;

the inner surface of the body being adapted to sealingly engage the discharge tube, and to stop the discharge tube in the conduit such that when the charging system is mated to the body the discharge tube is urged against the inner surface of the body thereby causing retraction of the discharge tube;

a rigid depressor for urging the pin to retract when the pressurized system is mated to the body; the depressor being mounted to the second end of the body clear of the conduit; and a resilient seal for discouraging leakage of fluid between the body and the fitting of the pressurized system; the seal being mounted to the body about the axis, wherein the depressor includes a pair of support arms connected to the body and a probe extending between the support arms; the probe urging the pin of the second valve assembly to retract when the body is mated to the fitting, and wherein the probe has a groove defined therein to center the actuating pin of the second valve assembly.

7. An apparatus for use with a charging system and a pressurized system for urging fluid from the charging system into the pressurized system, the charging system initially containing the fluid held under pressure, the charging system having a first pressure-actuated valve assembly, the first valve assembly having a first valve and a rigid discharge tube connected to the first valve, the discharge tube being retractable to actuate the first valve to release the fluid from the charging system, the pressurized system having a fitting and a second pressure-actuated valve assembly mounted within the fitting, the second valve assembly having a second valve and a pin connected to the second valve, the pin being retractable to actuate the second valve to allow entry of the fluid into the pressurized system, the apparatus comprising:

a rigid body with a longitudinal axis having a first end about the axis for connecting the body to the charging system and a second end about the axis for connecting the body to the fitting of the pressurized system; the body being generally cylindrical about the axis;

the body having an inner surface defining a conduit within the body; the conduit extending between the first and the second ends for fluid communication therebetween;

the conduit at the first end being adapted to receive the discharge tube of the first valve assembly;

the inner surface of the body being adapted to sealingly engage the discharge tube, and to stop the discharge tube in the conduit such that when the charging system is mated to the body the discharge tube is urged against the inner surface of the body thereby causing retraction of the discharge tube;

a rigid depressor for urging the pin to retract when the pressurized system is mated to the body; the depressor being mounted to the second end of the body clear of the conduit; and a resilient seal for discouraging leakage of fluid between the body and the fitting of the pressurized system; the seal being mounted to the body about the axis, wherein the conduit is gradually narrowed between the first end and the second end of the body such that when the charging system is connected to the body a seal is formed between the discharge tube and the inner surface of the body.

8. An apparatus for use with a charging system and a pressurized system for urging fluid from the charging system into the pressurized system, the charging system initially containing the fluid held under pressure, the charging system having a first pressure-actuated valve assembly, the first valve assembly having a first valve and a rigid discharge tube connected to the first valve, the discharge tube being retractable to actuate the first valve to release the fluid from the charging system, the pressurized system having a fitting and a second pressure-actuated valve assembly mounted within the fitting, the second valve assembly having a second valve and a pin connected to the second valve, the pin being retractable to actuate the second valve to allow entry of the fluid into the pressurized system, the apparatus comprising:

a rigid body with a longitudinal axis having a first end about the axis for connecting the body to the charging system and a second end about the axis for connecting the body to the fitting of the pressurized system; the body being generally cylindrical about the axis;

the body having an inner surface defining a conduit within the body; the conduit extending between the first and the second ends for fluid communication therebetween;

the conduit at the first end being adapted to receive the discharge tube of the first valve assembly;

the inner surface of the body being adapted to sealingly engage the discharge tube, and to stop the discharge tube in the conduit such that when the charging system is mated to the body the discharge tube is urged against the inner surface of the body thereby causing retraction of the discharge tube;

a rigid depressor for urging the pin to retract when the pressurized system is mated to the body; the depressor being mounted to the second end of the body clear of the conduit; and a resilient seal for discouraging leakage of fluid between the body and the fitting of the pressurized system; the seal being mounted to the body about the axis, wherein the conduit is gradually narrowed between the first end and the second end of the body such that when the charging system is connected to the body, a stop for the discharge tube is formed.

* * * * *